United States Patent [19]

Esola

[11] 4,080,827
[45] Mar. 28, 1978

[54] UNIDIRECTIONAL INDEX DRIVE FOR GAS METERS

[75] Inventor: John L. Esola, Falls Creek, Pa.

[73] Assignee: Rockwell International Corporation, Pittsburgh, Pa.

[21] Appl. No.: 752,676

[22] Filed: Dec. 20, 1976

[51] Int. Cl.² .............................................. G01F 15/00
[52] U.S. Cl. ................................................... 73/275
[58] Field of Search .......................... 73/275, 266, 267

[56] References Cited

U.S. PATENT DOCUMENTS

| 2,165,387 | 7/1939 | Knight, Jr. | 73/275 |
| 2,281,670 | 5/1942 | Brown | 73/268 |

Primary Examiner—Richard C. Queisser
Assistant Examiner—John P. Beauchamp

[57] ABSTRACT

An improvement in the drive to the index, or register, of diaphragm-type gas meters is disclosed, in which the index always runs in the same direction, regardless of the direction of flow of fluid through the meter.

7 Claims, 4 Drawing Figures

UNIDIRECTIONAL INDEX DRIVE FOR GAS METERS

BACKGROUND OF THE INVENTION

Diaphragm type gas meters, in which the volume of gas consumed is measured by the movement of one or more bellows, or diaphragms, are widely known and used for relatively low flows, such as domestic metering. The diaphragm is mechanically connected through a linkage to an index, or register, which accumulates the total volume of gas passed through the meter, usually measured in cubic feet. One of these meters and its operation is described in U.S. Pat. No.2,544,655, issued Mar. 13, 1951, to which reference may be had for a more detailed explanation of the operation of this type of meter.

By the nature of its construction, these meters are able to be run backward by a reversal of flow of fluid through them. When gas is introduced into the outlet passage and allowed to flow through the meter in a reverse direction, the index, or register also operates backward, reducing the total reading instead of increasing it. While the meter is not nearly so accurate when run backward, unscrupulous people have in the past resorted to operating the meter in the reverse direction to reduce the reading on the index, and thus avoid paying for some or all of the gas they consume. This can be accomplished in a number of ways, but the most common is simply to detach the meter from the inlet and outlet pipes and reinstall it reversed. Thus, the meter is operated in the reverse direction, and by doing this during a period when the meter is not scheduled to be read, can go undetected. While the utility company may suspect that tampering is taking place, proving the fact of tampering is difficult, and taking action on it is a sensitive matter.

SUMMARY AND OBJECTS OF THE PRESENT INVENTION

It is a primary object of this invention to provide a drive to the index, or register, that drives the index in one direction, regardless of the direction of flow of fluid through the meter. It is a corollary object of this invention to prevent the reducing total reading on the index by operating the meter with a reverse flow of fluid through it. It is an additional object of the invention to provide an output drive that is easily incorporated into present meter designs, without the necessity for extensive changes to the tooling. It is a further object of the invention to provide an output drive to a gas meter index which is easy to construct, economical, and easily maintained.

DESCRIPTION OF THE PREFERRED EMBODIMENT

Most of the diaphragm gas meters, which are normally used for measurement of domestic gas consumption, are constructed and operate in the manner described in U.S. Pat. No. 2,544,665, referred to above. Briefly, the flow of gas through the meter moves one or more flexible diaphragms, which in turn operates (through linkages) valving controlling the gas flow and drives an index, or register, which records the volume of gas passing through the meter. By the nature of their construction and operation, these meters are capable of being operated in a direction reverse to the normal, or usual manner. When this happens, the drive to the index, or register, is also reversed. This capability has been utilized to "wipe off" some of the total gas recorded on the index, and thus lower the bill of the consumer. A number of solutions to this problem have been proposed, but for one reason or another none of these has been adopted. This invention would not interrupt the flow of fuel to the customer, while registering the flow, regardless of the direction of that flow.

Figure 1:
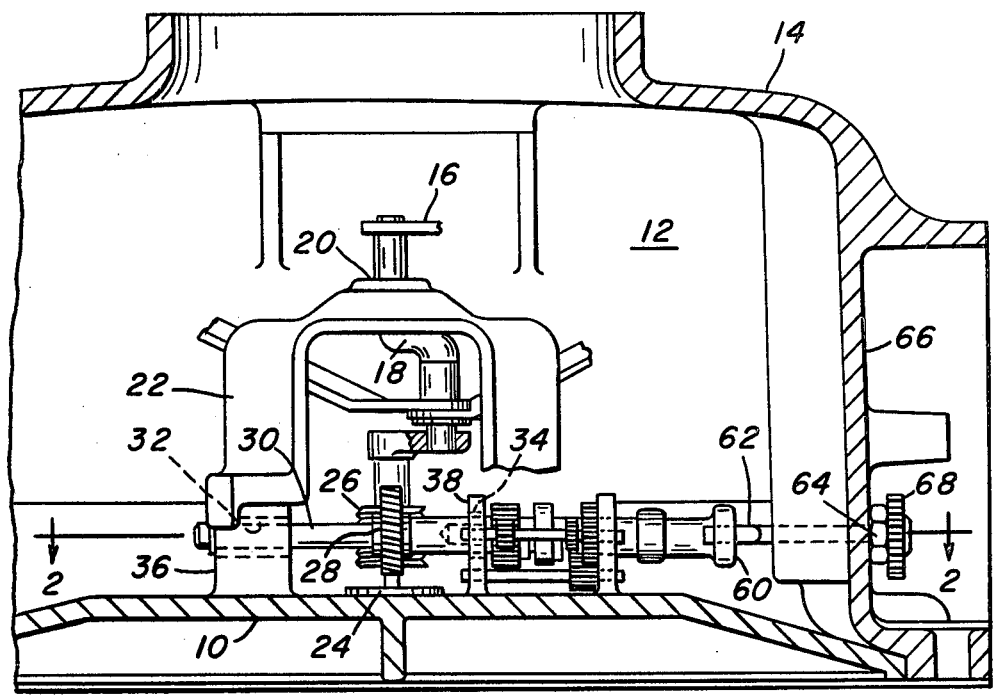
FIG. 1 is a section in elevation through the upper portion of a diaphragm-type gas meter, showing the cap plate upon which the valving and crank are mounted, with parts of the linkage to the bellows and the valving omitted for clarity.
Figure 2:
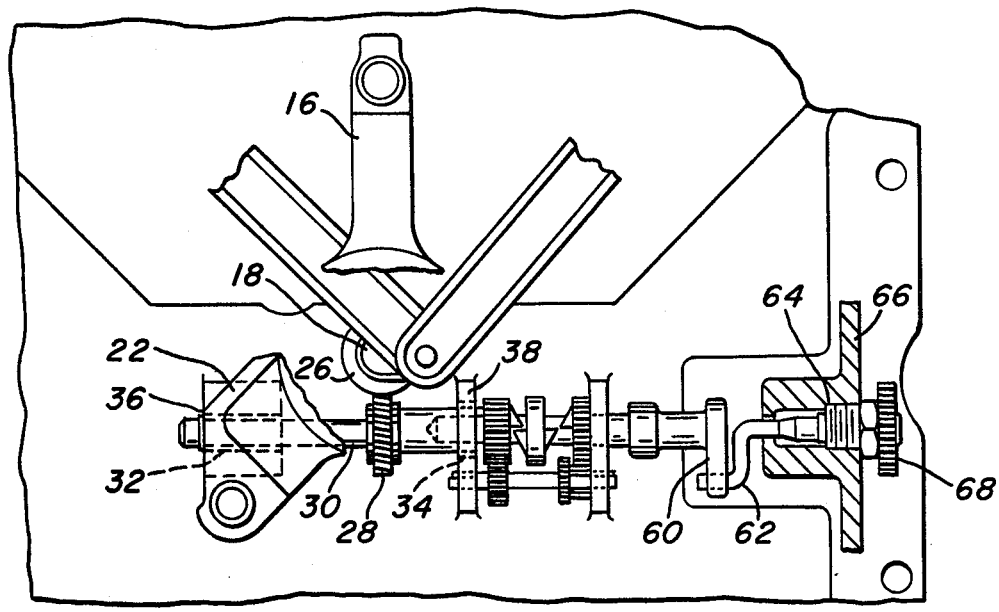
FIG. 2 is a sectional view along the line 2—2 of FIG. 1.

Referring to the drawings, especially FIGS. 1 and 2, a portion of the upper part of a diaphragm-type gas meter is shown. A cap plate 10 divides the diaphragm chambers from a gas chamber 12. The chamber 12 is enclosed by a top cover 14 and contains the valving (not shown) and drive mechanism (also mostly omitted for clarity). As mentioned above, most diaphragm-type gas meters operate in a manner similar to U.S. Pat. No. 2,544,665 to which reference can be made for understanding the operation of the meter.

The movement of the diaphragms is transmitted through linkages to a tangent arm 16 which turns a crank 18. The upper bearing 20 of the crank is mounted on a bracket 22 which is mounted on the cap plate 10. Parts of the bracket 22 have been broken away to more clearly show the invention, as have the flag links and, in FIG. 2, the top bearing 20 of the crank 18 and the tangent arm 16. Crank 18 has a lower bearing 24 in the cap plate 10. Mounted on crank 18 is a worm 26 which is engaged with a worm gear 28 mounted on a horizontal shaft 30. Shaft 30 is journalled in suitably spaced bearings 32 and 34 formed in suitable brackets 36 and 38, respectively. Up to this point, the construction is conventional and widely used in the industry.

Figure 3:
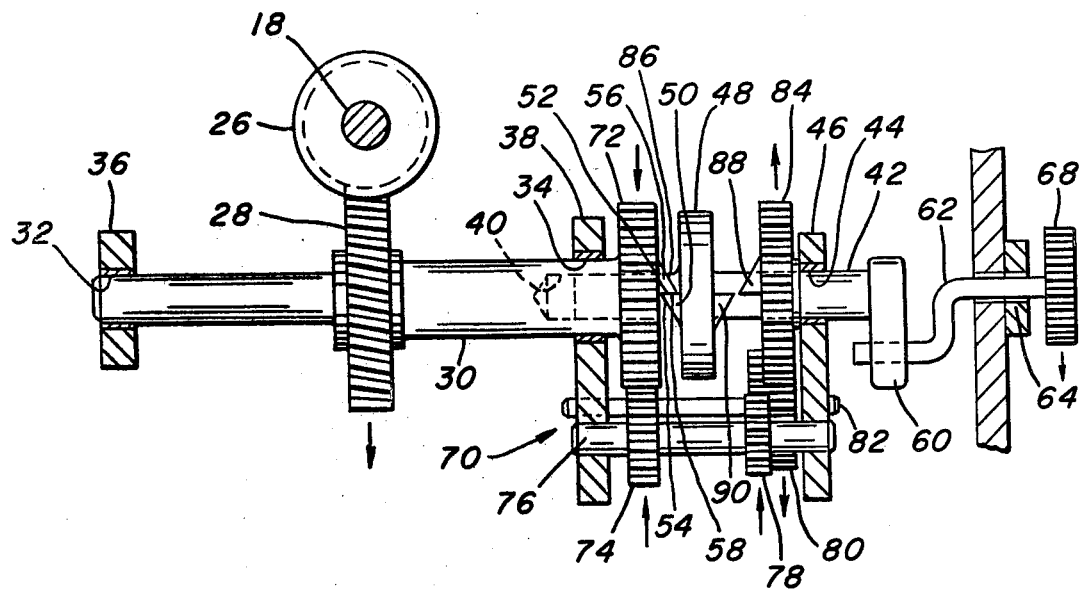
FIG. 3 is a view on a larger scale of the drive of FIG. 1, with the drive from the meter being in the normal direction of fluid flow.

Referring now to the figures, and more particularly to FIG. 3, the improvement comprises the addition of a novel drive system that assures the rotation of the output in one direction only. One end of shaft 30 carries a blind bore 40 for journalling a shaft 42 which is also journalled in a bearing 44 in bracket 46. Shaft 42 is freely rotatable relative to shaft 30, but is axially fixed against longitudinal movement. A cam carrier 48 is slidably mounted on shaft 42 by splines (not shown) or the like for rotational driving of the shaft. Alternatively, cam carrier 48 may be fixed to shaft 42, and the shaft and cam carrier can be slidable, longitudinally. The cam carrier can be any desired shape, but is preferably symmetrical about the longitudinal axis of shafts 30 and 42. A cam 50 projects from one face of cam carrier 48, having a coupling face 52 and a trailing edge 54. Cam 50 is adapted to engage a similarly-shaped cam 56 mounted on the end face of shaft 30. When the meter drive is in a normally forward direction, face 58 of cam 56 is in engagement with face 52 of cam 50, and by means of the rotational coupling between cam carrier 48 and shaft 42, the shaft rotates in a counter-clock-wise direction as viewed from the right end of FIG. 3. The end of shaft 42 has a dog drive 60 to a meter index drive 62, which carries rotation through a stuffing box 64 fixed in a recess 66 of meter cover 14. The meter index drive gear 68 is thus rotated in a counter-clock-wise direction also, as viewed from the right end of FIG. 3.

While rotation in this direction is taking place, the gear drive assembly 70 is rotating as shown by the arrows, but is producing no output. The gear assembly is as follows: a spur gear 72 is fixed on the end of shaft 30 to rotate with it. A pinion 74 is fixed on an idler shaft 76 which is journalled for rotation in brackets 38 and 46 and meshes with spur gear 72. Also fixed on idler shaft 76 in gear 78, which drives a gear 80, journalled on a shaft 82. Gear 80 drives a gear 84, which is rotatable but axially fixed on shaft 42. It will be seen from this description and the directional arrows of FIGS. 3 and 4 that when shaft 30, drive cam 56 and spur gear 72 rotate in one direction, gear 84 rotates in the opposite direction. As shown in FIG. 3, gear 84 thus rotates a shaft 42 without any results, the drive, as described above, being from cam 56 through cam 50 and shaft 42 to meter index drive 62.

Figure 4:
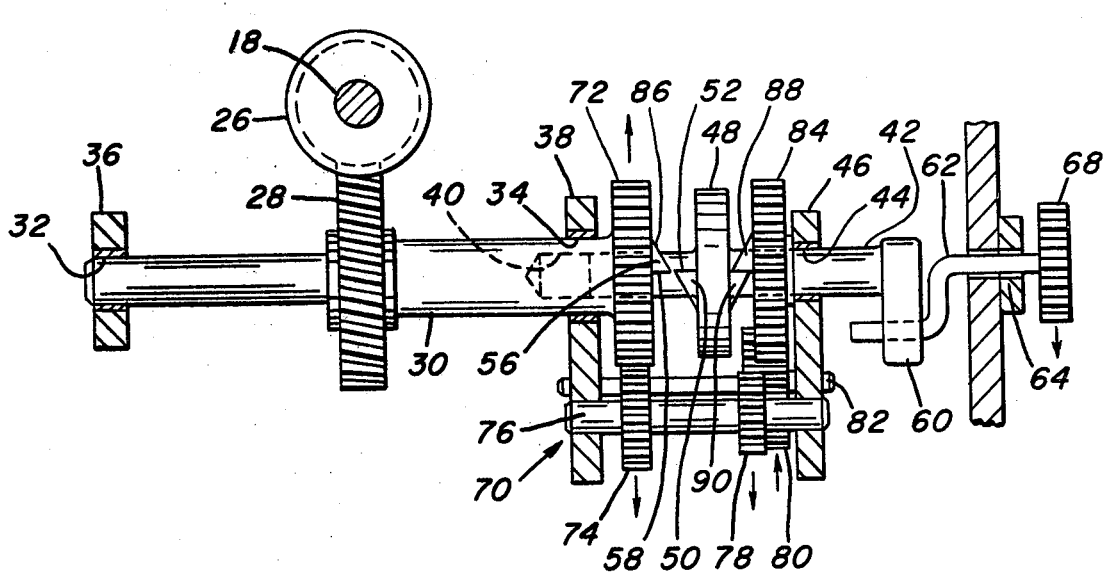
FIG. 4 is a view similar to FIG. 3, with the meter being operated in the reverse direction.

Whenever the meter is operated in the reverse direction, however, shaft 30 reverses rotation. When this occurs, a trailing edge 86 of cam 56 engages with the slope of trailing edge 54 of cam 50 and pushes cam carrier 48 to the right as seen in FIGS. 3 and 4, to the position shown in FIG. 4. Then, cam 88 on gear 84 engages cam 90 on cam carrier 48. The drive then is from spur gear 72, which rotates pinion gear 74, which in turn rotates gear 78 through idler shaft 76. Gear 78 drives gear 80, which in turn drives gear 84. Gear 84 rotates face mounted cam 88, which is face coupled to cam 90. Cam 90 and cam carrier 48 drive shaft 42, but in the same direction of rotation as is the case when cams 50 and 56 are coupled.

Thus, it will be apparent that regardless of the direction of rotation of crank 18 and shaft 30, the index drive gear 68 will rotate in the same direction. Cams 56 and 88 are mirror images of each other, with their driving faces on a plane through the axis of shafts 30 and 42 and the trailing faces each going in a clockwise direction from the driving face, as viewed from the right hand side of the drawing figures. The driven cams 50 and 90 have driven faces shaped for coupling to their driving cams 56 and 88, respectively, and trailing edges each going in a counter-clockwise direction from the driven face, as viewed from the right hand end of the drawing figures.

As shown in the drawings, the assembly is so constructed as to have clearance between the tip of drive cam 56 and the tip of drive cam 88 only slightly greater than the width of cam carrier 48 and one cam (either cam 50 or cam 90), so that upon reversal of the meter, the driving cam that had been driving the index pushes the cam carrier 48 into the path of the other drive cam, by engagement of the back faces of the first drive-driven cam set. Thus it is evident that the output of this unique drive assembly is always in the same direction, regardless of the direction of rotation of the input. Accordingly, the index or register, of the meter will always accumulate an increasing reading regardless of the direction of flow of fluid through the meter.

I claim:

1. In a diaphragm type gas meter, coupling means connected between rotating means responsive to gas flow and the index of the meter comprising, a pair of drive cams driven in opposite directions by said rotating means, a pair of driven cams, a driven cam carrier having opposed faces carrying said driven cams on said faces, respectively, a driven shaft, said cam carrier coupled to said driven shaft for rotating said driven shaft and slidable along said driven shaft for selective engagement of one of said driven cams with one of said drive cams depending upon the direction of flow through the meter, whereby said driven shaft drives said meter index in one direction only.

2. The coupling means of claim 1, wherein a first of said drive cams is fixed to the rotating means output.

3. The coupling means of claim 2, wherein said pair of drive cams are rotatably driven in opposite directions by gear train means.

4. The coupling means of claim 3, wherein said drive cams are reversible.

5. Coupling means for gas meter index drives comprising a pair of spaced-apart reversible drive cams connected by gear train means to rotate in opposite directions and being driven by the flow of gas through a gas meter, a cam carrier, a pair of driven cams on said cam carrier, a driven shaft, said cam carrier coupled to said driven shaft for rotating said driven shaft and slidable along said driven shaft for selective engagement of one of said driven cams with one of said drive cams depending upon the direction of flow through the meter, whereby said driven shaft drives said meter index in one direction only.

6. The coupling means of claim 5, wherein said drive cam drive faces are parallel to the axis of said driven shaft, and rear faces sloped as that reversal of said flow of gas through said meter, and consequent reversal of said drive cams separate one drive cam-driven cam linkage and initiates coupling of the other drive cam-driven cam linkage thus driving said driven shaft means in the same direction.

7. Coupling means for gas meter index drives comprising, drive shaft means driven by the meter crank, driven shaft means journalled for rotation in one end of said drive shaft means, said driven shaft means driving said index, gear means connected between said drive shaft means and an output gear for rotating said output gear in the opposite direction of rotation from said drive shaft means, said output gear journalled on said driven shaft means, a pair of drive cams mounted on said drive shaft means and said output gear respectively, said drive cams configured to drive in one direction of rotation only a pair of driven cams slidably mounted on said driven shaft means between said drive cams and having surfaces for selectively coupling one of said driven cams with one of said drive cams depending upon the direction of flow through the meter, said driven cam means rotatively coupled to said driven shaft, thereby rotating said driven shaft means in one direction only.

* * * * *